(12) United States Patent
Raynor (10) Patent No.: US 8,100,425 B2
(45) Date of Patent: Jan. 24, 2012

(54) BICYCLE HAVING INDEPENDENT REAR WHEEL STEERING

(76) Inventor: Maurice Raynor, Los Angeles, CA (US)

( * ) Notice: Subject to any disclaimer, the term of this patent is extended or adjusted under 35 U.S.C. 154(b) by 125 days.

(21) Appl. No.: 12/184,985

(22) Filed: Aug. 1, 2008

(65) Prior Publication Data

US 2010/0025956 A1 Feb. 4, 2010

(51) Int. Cl.
*B62K 21/00* (2006.01)
(52) U.S. Cl. .............................. 280/269; 280/771
(58) Field of Classification Search .............. 280/267, 280/268, 269, 771
See application file for complete search history.

(56) References Cited

U.S. PATENT DOCUMENTS

| 3,642,083 | A | * | 2/1972 | Rodler, Jr. | 180/224 |
|---|---|---|---|---|---|
| 4,451,064 | A | * | 5/1984 | Perkins | 280/259 |
| 4,506,902 | A | * | 3/1985 | Maebe | 280/266 |
| 4,650,023 | A | * | 3/1987 | Matsuda et al. | 180/219 |
| 5,485,893 | A | * | 1/1996 | Summers | 180/219 |
| 5,931,244 | A | * | 8/1999 | Renfroe et al. | 180/6.32 |
| 5,954,349 | A | * | 9/1999 | Rutzel | 280/87.041 |
| 6,062,581 | A | * | 5/2000 | Stites | 280/263 |
| 6,102,420 | A | * | 8/2000 | Hoeksta | 280/269 |
| 6,378,882 | B1 | * | 4/2002 | Devine | 280/234 |
| 7,073,822 | B1 | * | 7/2006 | Renfroe et al. | 280/771 |
| 7,121,567 | B1 | * | 10/2006 | Gaea | 280/267 |
| 2009/0283984 | A1 | * | 11/2009 | Killian | 280/267 |

* cited by examiner

*Primary Examiner* — Kevin Hurley (57) ABSTRACT

A wheeled vehicle, which may be a bicycle, having independent front and rear wheel steering, and rear wheel propulsion from a pedal assembly. The rear wheel is pivotally mounted to enable steering. The rear sprocket transmits torque to a jointed drive shaft which drives the rear wheel at any degree of steering. Rear steering is actuated by a frame mounted control lever, which draws a flexible cable which extends through the hollow frame. Indicia indicates the degree of rear steering. The control lever has a locking feature to prevent inadvertent steering. The rear wheel is pivotally mounted to the frame to enable clearing obstacles in the road.

3 Claims, 6 Drawing Sheets

BICYCLE HAVING INDEPENDENT REAR WHEEL STEERING

FIELD OF THE INVENTION

The present invention relates to bicycles, and more particularly to a bicycle having rear wheel steering which is independent of front wheel steering.

BACKGROUND OF THE INVENTION

Bicycles have been provided with special riding effects to offer variety to the otherwise usual riding experience. For example, rear wheel steering is known. Another variation to traditional riding characteristics is the so-called "swing bike". A swing bike is essentially an articulated bicycle which introduces more dynamic responses to steering inputs due to its articulated frame.

SUMMARY OF THE INVENTION

The present invention contemplates a wheeled vehicle, which may be a bicycle, which has rear wheel steering which is independent from its front wheel steering, in combination with rear wheel propulsion via an endless flexible drive chain or belt. The rear wheel is pivotally mounted to the frame to enable steering to the right and to the left.

The rear wheel steered vehicle provides new avenues in special effects vehicles. Illustratively, with the rear wheel turned to a right angle to the frame, pedaling can result in the rear wheel describing circles around the front wheel. The rear wheel may be turned to a lesser degree, and with the front wheel being steered, the entire vehicle may travel at an acute angle to the longitudinal direction of the frame. If the front and rear wheels are steered either simultaneously or one at a time while the vehicle is under propulsion, many additional effects may be enjoyed which would not be available from for example a traditional bicycle or even an articulated bicycle.

The novel vehicle accommodates the functions of steering and propulsion in the following way. A drive chain or belt using sprockets or the like may be provided. The chain or belt and its associated sprockets occupy a vertical plane. Changes in the heading of the steerable rear wheel may be accommodated by a jointed shaft which transmits torque from the rear sprocket to the rear wheel.

The rear wheel steering system may be actuated by a control lever mounted on the frame in front of the seat. The control lever may be slid longitudinally along the frame. The control lever may pull a flexible cable which extends to the rear wheel. The cable may engage the rear wheel at points near the rubber tire, so that the cable enjoys significant leverage over the resistance of the rear wheel to heading changes, in response to the linear motion of the control lever along the frame of the vehicle. The cable may pass through hollow frame tubing of the vehicle for at least part of its length. The vehicle frame may bear indicia indicating the degree of steering of the rear wheel. The control lever may have a lockup feature which opposes unintended steering changes of the rear wheel.

The rear wheel may be pivotally mounted to the vehicle frame, for example to enable rising and falling to clear minor obstacles.

It is therefore an object of the invention to provide a pedaled vehicle having both front wheel steering and also independent rear wheel steering, in combination with rear wheel propulsion.

It is an object of the invention to enable many unusual driving effects to be made possible in a pedaled vehicle.

It is an object of the invention to provide a cable steering system operated by a control lever which is slidably mounted on the frame of the vehicle.

A further object of the invention is to provide a lockup feature which opposes unintended rear wheel steering.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
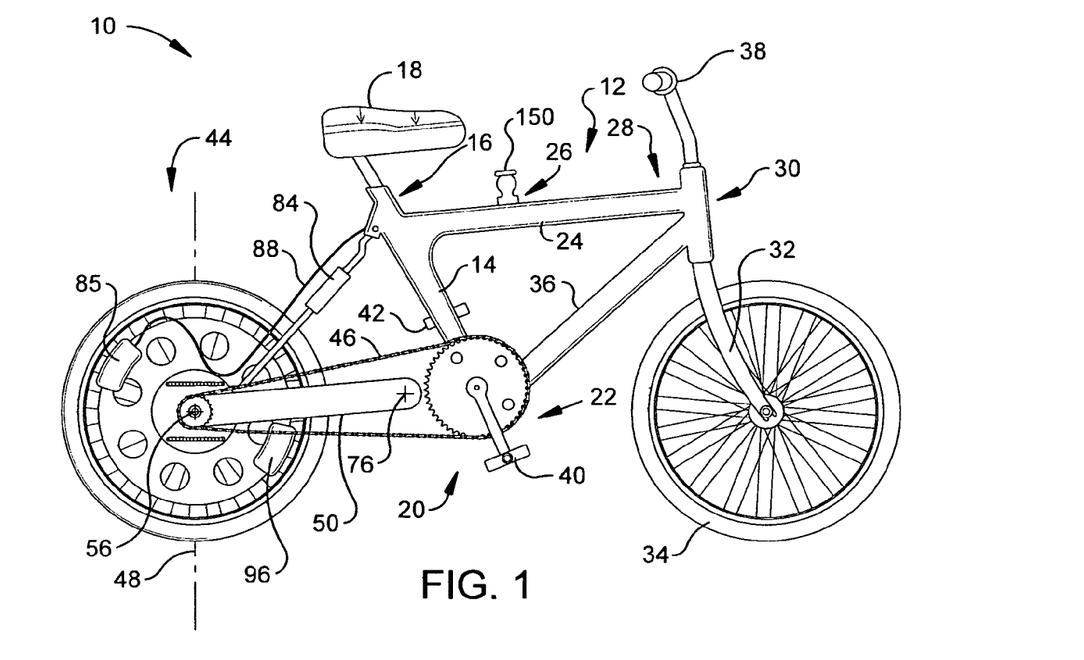
FIG. 1 is a side view of a wheeled vehicle according to at least one aspect of the invention, showing a rear wheel in a conventional steering attitude.

FIG. 1 shows a wheeled vehicle in the form of a bicycle 10 according to at least one aspect of the invention. The bicycle 10 may have a frame platform 12 made from tubing forming a triangle, comprising a generally vertical seat post 14 having a proximal end 16 adapted to receive and support a bicycle seat 18, and a distal end 20 adapted to rotatably support a crank assembly 22. The crank assembly 22 is part of a drive system disposed to rotate the rear wheel under power, the drive system being further detailed hereinafter. The frame platform 12 may further comprise a generally horizontal frame member 24 having a proximal end 26 connected to the seat post 14 near the proximal end 16 of the seat post 14, and a distal end 28 located forwardly of the proximal end 26, terminating in a steering support 30. The steering support 30 may support a steering fork assembly 32 to which a front wheel 34 is mounted. Handle bars 36 may be connected to the steering fork 32, which are adapted to steer the front wheel 34 in a conventional manner. The frame platform 12 may further comprise an inclined connector bar 36 spanning and fixed to the distal end 28 of the horizontal frame member 24 via the steering support 30 and the distal end 20 of the seat post 14. The seat post 14, the horizontal frame member 24, and the connector bar 36 may collectively generally form a triangle.

At the front of the bicycle 10, the fork assembly 32, which is rotatably supported at the steering support 30 for rotation about a generally vertical axis, may be steered in conventional manner by handle bars 38. The crank assembly 22, which is rotatably supported at the distal end 20 of the seat post 14, has pedals 40 and 42 connected thereto.

Orientational terms such as up and down refer to the described object as it is depicted in the referenced drawing figure. The front of the wheeled vehicle such as the bicycle 10, is that end having the handle bars 38 and facing the usual direction of travel. The rear end is that end proximate the seat 18, or closer to the seat 18 than to the handle bars 38. A forward direction is from the seat 18 to the handle bars 38. It will be appreciated that the subject wheeled vehicle is capable of traveling in many directions including maneuvers wherein one wheel such as the front wheel 34 may possibly not progress along the ground but instead may only pivot, while the other wheel or wheels, such as the rear wheel 44, orbit around the pivoting wheel. Therefore, orientational terms must be understood to provide semantic basis for purposes of description, and do not limit the invention or its component parts in any particular way.

It should be noted that while the bicycle 10 has a front wheel 34 and a rear wheel 44 mounted to the frame platform 12, a different number of wheels may be accommodated by the invention. Thus, a vehicle having three, four or even more wheels (none shown) may enjoy the benefits of the invention.

The front steering system comprising the handle bars 38, the steering support 30, the front fork 32, and the front wheel 34, for turning the front wheel 34 to the right and to the left is conventional. However, this is not the case with a rear steering system for turning the rear wheel 44 to the right and to the left independently of steering the front wheel 34, especially when taken in combination with a drive system disposed to rotate the rear wheel 44 under power. The rear steering system is capable of directly imposing rotational steering inputs to the rear wheel 44. That is, the rear steering system directly and actively turns the rear wheel 44 to the right and to the left, as opposed to passively following the front of the bicycle 10 or passively steering responsive to the rider leaning to the right and to the left. This holds true for all vehicles according to at least one aspect of the invention, and not just for the bicycle 10 which has one and precisely one rear wheel 44, and one and precisely one front wheel 34.

The crank assembly 22 drives a flexible endless drive element, which may comprise a belt (not shown) or a chain 46, disposed to transmit power to the rear wheel 44, as will be explained in greater depth hereinafter.

Figure 2:
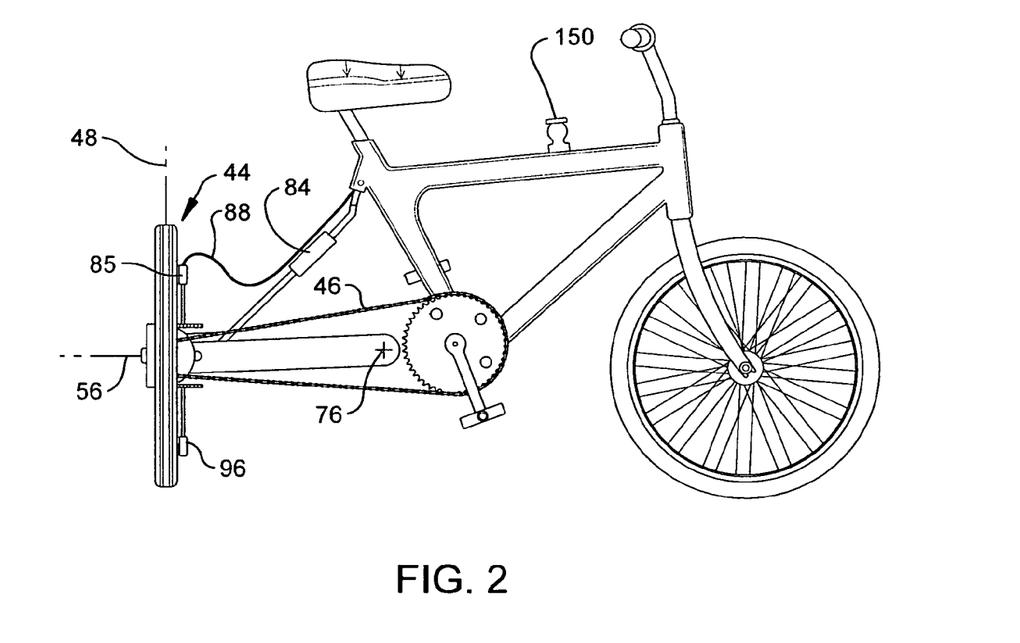
FIG. 2 is a side view similar to FIG. 1 but showing the rear wheel in an alternative steering attitude.

Turning now to FIG. 2, the rear wheel 44 has been turned to an angle perpendicular to its former orientation seen in FIG. 1. This is enabled by an arrangement wherein the rear wheel 44 is mounted to enable pivoting relative to the frame platform 12 about a generally vertical axis 48. Of course, the rear wheel can rotate about a generally horizontal axis 50 for propulsion.

Figure 3:
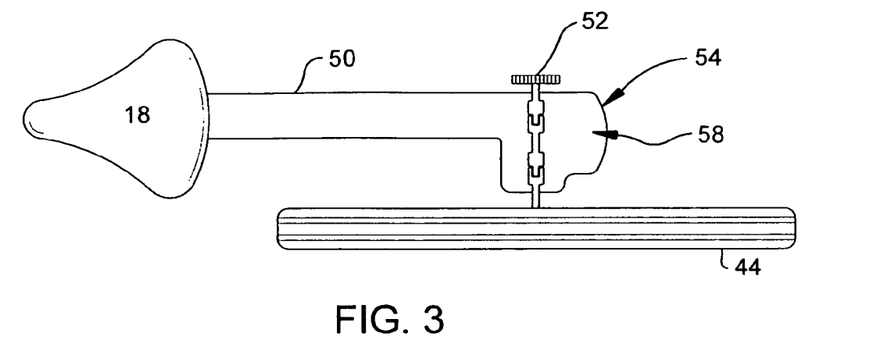
FIG. 3 is a partial diagrammatic top plan view of a wheeled vehicle at a steering attitude similar to that of FIG. 1.
Figure 4:
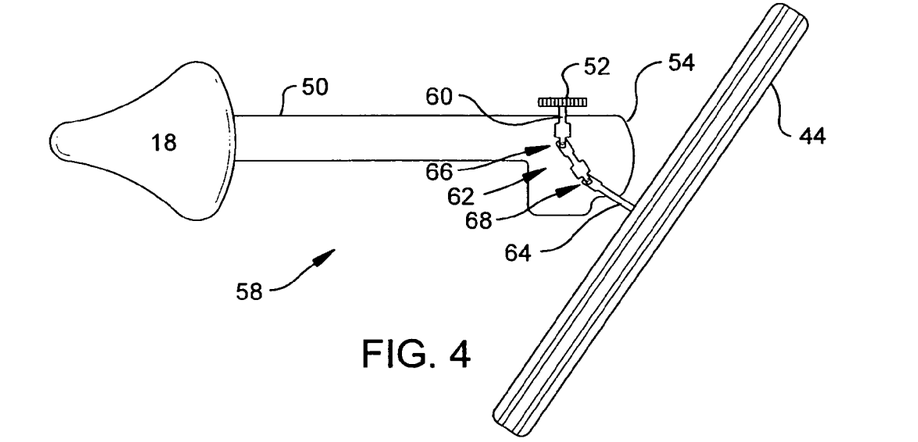
FIG. 4 is a partial diagrammatic top plan view similar to FIG. 3, but showing the rear wheel at an intermediate steering attitude.
Figure 5:
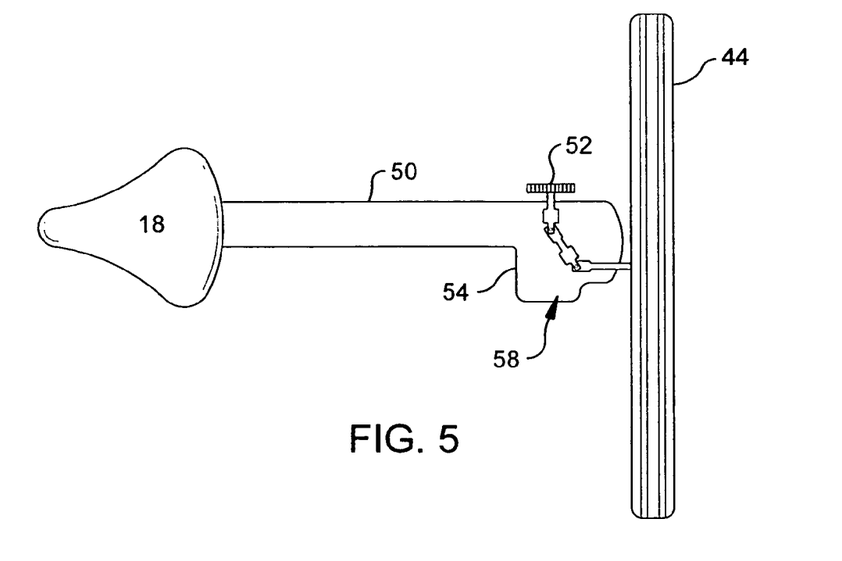
FIG. 5 is a partial diagrammatic top plan view similar to FIG. 3, but showing the rear wheel at a progressively greater steering attitude.

Relationship of fixed components to components which are pivotal for steering purposes is best understood with reference to FIGS. 3, 4, and 5. Bearing in mind that FIGS. 3, 4, and 5 are diagrammatic, and serve only to explain rear wheel steering, it is seen that a structural bar 50 which connects the rear wheel 44 to the frame platform 12 (not seen in FIGS. 3-5) may be regarded as a fixed member for the purposes of explaining steering. The structural bar 50 is fixed in the sense that it always is aligned along the length of the bicycle 10. The chain 46 (see FIGS. 1 and 2) drives a rear sprocket 52, which although rotatable, is fixed in position relative to a housing 54. The housing 54 is a mobile stable wheel holding base which is fixed to the structural bar 50, also referred to as a main bar 50.

The rear wheel 44 is held by a pivotal bearing arrangement, which will be further described hereinafter, to enable the rear wheel 44 to undergo steering turns. Therefore, it will be appreciated that the main bar 50 and the housing 54 remain fixed, or longitudinally aligned with the frame platform 12, while enabling the rear wheel 44 both to rotate about a generally horizontal axis 56 for propulsion and also to pivot about the generally vertical axis 48 to steer. The axes 48 and 56 are best seen in FIGS. 1 and 2.

FIG. 3 shows the rear wheel 44 in an orientation appropriate for conventional travel, or directed parallel to the longitudinal axis of the bicycle 10. FIG. 4 shows the rear wheel turned to about a forty-five degree angle to the conventional orientation of FIG. 3. In FIG. 4, it becomes clear that the main bar 50, the rear sprocket 52, and the housing 54 remain in constant or fixed orientation relative to the fore and aft direction, which direction coincides with the longitudinal axis of the bicycle 10. It also becomes clear that a multi-jointed universal drive 58 accommodates steering of the rear wheel 44 while rotating the rear wheel 44 responsive to movement of the chain 46.

The universal drive 58 may comprise a primary driven shaft 60 which is driven by the chain 46 via the rear sprocket 52; an intermediate driven shaft 62, and a final driven shaft 64 which is driven by intermediate shaft 62. A first universal joint 66 is connected between and transfers drive torque from the primary driven shaft 60 and the intermediate shaft 62. A second universal joint 68 is connected between and transfers drive torque from the intermediate shaft 62 to the final driven shaft 64.

Figure 6:
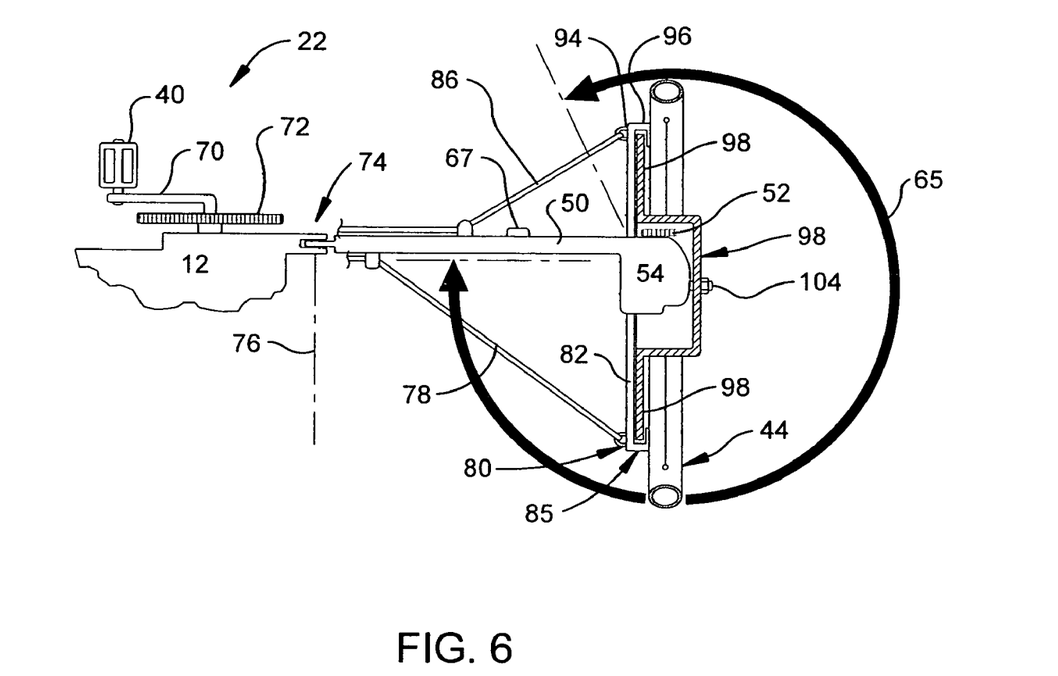
FIG. 6 is a diagrammatic top plan detail view of a wheeled vehicle according to at least one aspect of the invention, illustrating a possible range of steering rotation of the steered rear wheel.

FIG. 5 shows a further degree of steering of the rear wheel 44. It should be noted that the rear wheel 44 may be steered to a still further steering orientation. This is shown in FIG. 6, wherein the range of steering which is available is indicated by the arrow 65. To prevent collision of a wheel component, such as an eye 94, a rubber bumper 67 may be fixed to the main bar 50. A corresponding rubber bumper (not shown) may be fixed to the main bar 50 at the opposite side.

FIG. 6 also shows more of the apparatus of the rear steering feature according to at least one aspect of the invention. The frame platform 12 is shown only in part, including that part which supports the cranks assembly 22. The crank assembly is seen to comprise a crank arm 70 to which are mounted the pedal 40 and a front sprocket 72. The chain 46 (see FIG. 2) is connected to the front sprocket 72 and the rear sprocket 52 to drive the latter upon rotation of the front sprocket 72.

One aspect of the invention is clearly shown in FIG. 6, namely, that the main bar 50 is pivotally connected at its proximal end to the frame platform 12 at a clevis 74. The distal end of the main bar 50 is pivotally connected to the rear wheel 44 to support the rear wheel 44 in a manner to be described hereinafter. The main bar 50 and hence the rear wheel 44 may pivot relative to the frame platform 12 about a generally horizontal axis 76. This feature enables for example the rear wheel 44 to rise to clear a small obstruction (not shown) which may be present in its path, without causing the frame platform 12 to be displaced upwardly.

Returning momentarily to FIG. 1, pivotal connection of the main bar 50 is supplemented by a telescopic mobile bar 84 connected to the frame platform 12 and to the main bar 50 near the distal end of the latter.

The main bar 50 and the telescopic mobile bar 84 collectively connect the rear wheel 40 to the frame platform 12 while enabling the rear wheel 44 to pivot in a vertical plane relative to the frame platform 12.

Returning now to FIG. 6, a flexible cable 78 on which the rear wheel steering system is based may be seen. The flexible cable 78, which is adapted to provide steering rotation inputs to the rear wheel, engages an eye 80 fixed to a steering arm 82 which in turn is fixed to a pivotal portion of the rear wheel 44. At its other end (not shown, the steering cable 78, which may pass through hollow frame tubes of the frame platform, such as the hollow horizontal frame member 24, for at least part of the extent of the cable 78, engages a manual control to be described hereinafter. Companion steering cable 86 is similarly routed to the manual controller. The steering cables 78 and 86 may comprise two separate cables or alternatively may comprise a single cable.

The steering arm 82 also supports a brake caliper 84. Brake cables, such as the brake cable 88 (see FIG. 2) may also be routed through at least one hollow frame tube, such as the horizontal frame member 24.

Figure 7:
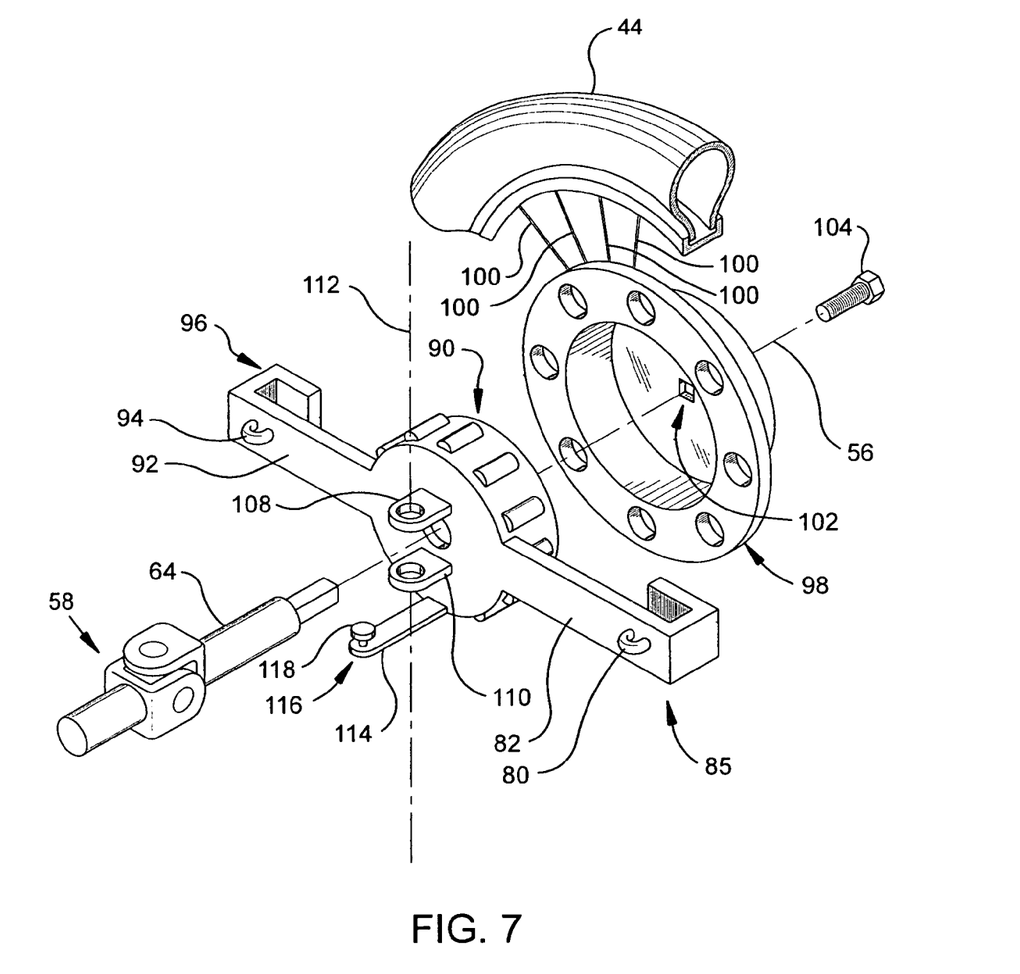
FIG. 7 is a diagrammatic exploded perspective detail view of wheel details taken from the center left of FIG. 2.

The brake disc 98 which may be subjected to braking forces imposed by the brake caliper 85 may be seen in FIG. 7, to which attention now turns. Pivotting of the rear wheel 44 as seen in FIGS. 3-5 is enabled by a mobile stable wheel holding base or pivotally mounted wheel spindle 90, which is ultimately fixed to the main bar 50 by connection at the housing 54. The wheel spindle 90 may include the steering arm 82 and a corresponding steering arm 92. The steering arms 82 and 92 have mobile anchors or eyes 80 and 94, respectively, for engaging or anchoring the ends of the steering cables such as steering cables 78 and 86 respectively. The brake caliper 85 and a corresponding brake caliper 96 are mounted on the respective steering arms 82 and 92 in proximity to a brake disc 98. The rear wheel 44, shown only partially in FIG. 7, is mounted to the brake disc 98 by spokes 100.

The spindle 90 has a central opening which is not called out by reference numeral, but is seen to be aligned with the rotational axis 56 of the rear wheel 44. This central opening enables the final driven shaft 64 of the universal drive 58 to pass through the spindle 90 to drivably engage the brake disc 98. The brake disc 98 also has a central opening 102, which is square or otherwise has non-circular characteristics, so that it may be driven by the square drive of the final driven shaft 64 of the universal drive 58 (see FIG. 4). A nut 104 may be provided to secure the brake disc 98 and hence the rear wheel 44 to the spindle 90.

The wheel spindle 90 is fixed to the main bar 50 (see FIG. 6) by a pivotal bearing arrangement adapted to engage the rear wheel 44 and to enable the rear wheel 44 to undergo steering turns, while the main bar 50 remains longitudinally aligned with the frame platform 12, while still enabling the rear wheel 44 to steer. To this end, the wheel spindle 90 pivots about a generally vertical axis 112, which is seen to pass through the centers of two trunnion holders 108 and 110. The trunnion arrangement, which enables the wheel spindle 90 to be supported on the housing 54 in a manner enabling the wheel spindle 90 to pivot about a generally vertical axis 112 while enabling the rear wheel 44 to be rotatably mounted on the wheel spindle 90 in a manner enabling the rear wheel 44 to rotate about the axis 56 to enable propulsion of the bicycle 10, is further explained hereinafter.

The wheel spindle 90 may have fixed thereto a guide arm 114 having a pin 116 bearing an enlarged head 118. This guide arm 114 guides the spindle 90 to move through an arcuate path when the spindle 90 rotates bout the axis 112.

Figure 8:
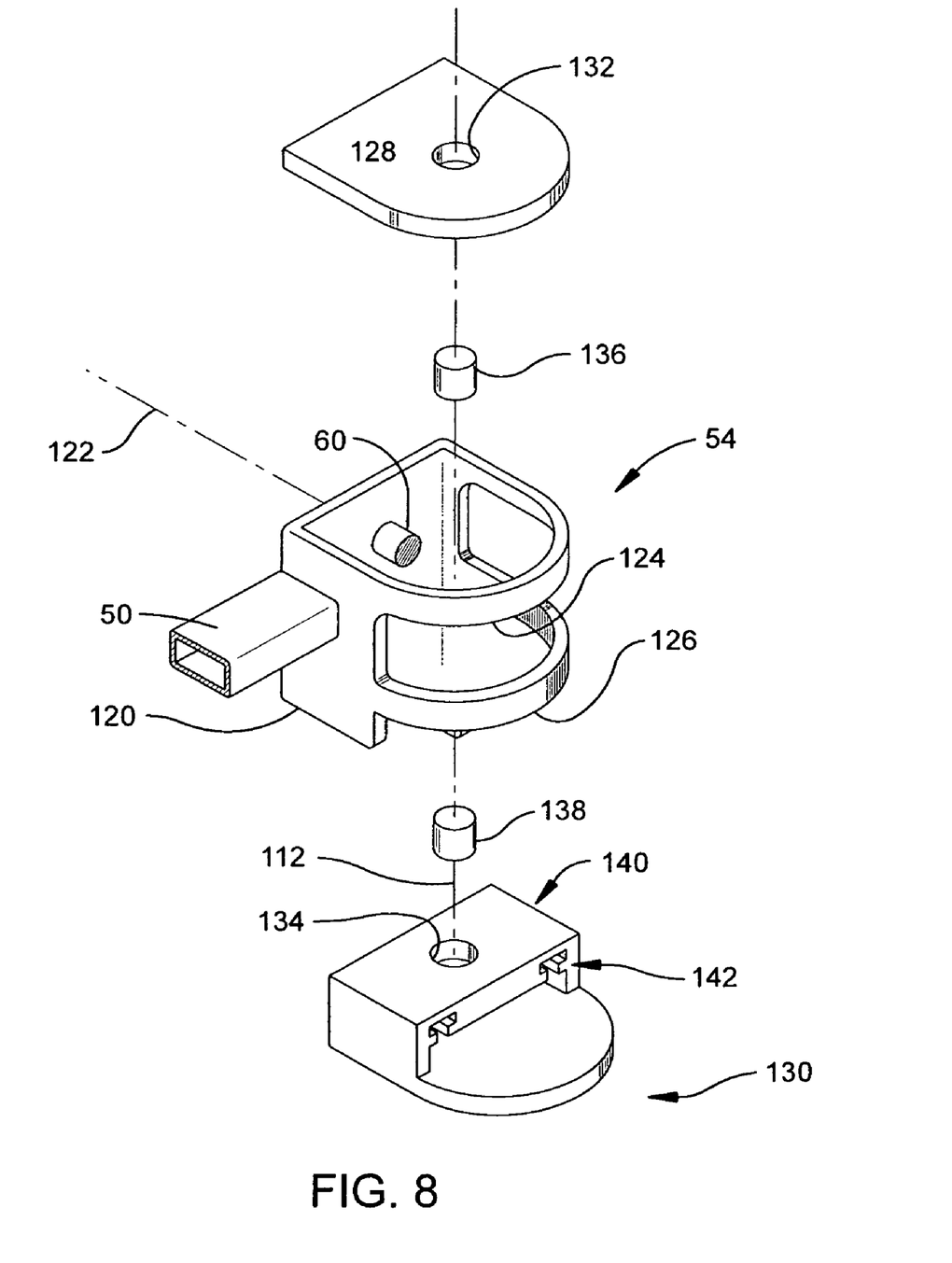
FIG. 8 is a diagrammatic exploded perspective detail view of a housing enclosing the subject matter of FIG. 7.

Turning now to FIG. 8, details of the housing 54 and its cooperation with the spindle 90 are explained. The housing 54 may comprise a vertical perimetric wall member 120 which supports a rotatable rear drive element such as the primary driven shaft 60, which is aligned with the rotational axis 122 of the rear sprocket 52. Of course, the axis 122 will be coincident with the axis 56 when the rear wheel 44 is in the orientation shown in FIG. 3, but may be non-coincident at other steering positions.

The wall member 120 may have a window 124 through which the universal drive 58 passes as it extends from the primary driven shaft 60 to the spindle 90, as shown in FIG. 7. A recess 126 enables the guide arm 114 to pass into the housing 54 from the spindle 90.

The wall member 120 is closed by an upper wall 128 and a lower wall 130. The wall members 120 and 130 are seen to have respective trunnion passages 132 and 134. The trunnion passages 132 and 134 are symbolic in nature as they are intended to designate respective mounting locations of trunnions 136 and 138 rather than literally signifying mounting details of the trunnions 136 and 138. The trunnions 136 and 138 may be mounted in any suitable way such that they coincide with the axis 112, as shown, and may be components separate from the housing 54 or alternatively may be integral therewith. Of course, the housing 54 may be formed from separate pieces such as the wall member 120, the upper wall 128, and the lower wall 130, or alternatively, any of these members may be integral with another, or in a further alternative may be formed in more than the three components shown.

The lower wall 130 is seen to have a grooved track 140 fixed thereto. The grooved track 140 bears an arcuate slot or groove 142. The groove 142 is dimensioned and configured to receive the enlarged head 118 of the guide arm 114 in close interfit. As the spindle 90 rotates about the axis 112, the enlarged head 118 moves in the arcuate path of the groove 142. The grooved track thereby assists in guiding the spindle 90 during steering.

Figure 9:
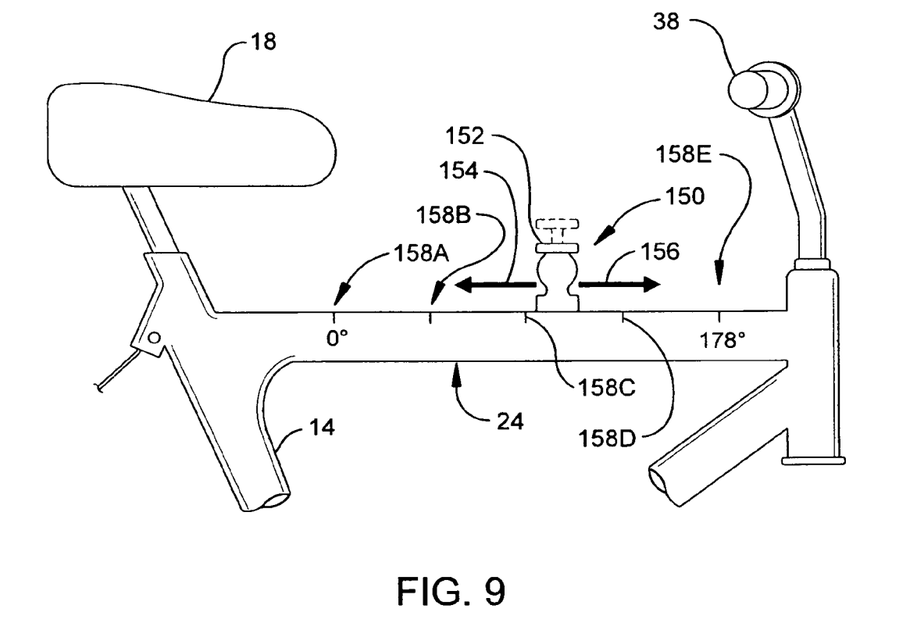
FIG. 9 is a diagrammatic enlarged side detail view of controls mounted on the frame of the wheeled vehicle, according to an aspect of the invention.

Referring now to FIG. 9, the rear steering feature is controlled by a steering control handle 150 mounted at the front of the seat 18, such as on the horizontal frame member 24 of the bicycle 10. The handle 150 is adapted to transmit tensile forces to the flexible cable or cables, such as the cables 78 and 86, responsive to being moved along the horizontal frame member 24 by a person's hand such that the flexible cable or cables impart steering inputs to the rear wheel 44 responsive to the operating forces.

The rear steering feature further comprises a vertical release member 152 which is adapted to release the steering control handle 150 to move between a locked position in which the rear steering system is constrained against changing steering attitude of the rear wheel 44, and a released position in which the rear steering system is movable to enable the steering control handle 150 to be moved to provide steering inputs to the rear wheel 150. The vertical release member 152 may be movable from the position shown in solid line upwardly as depicted to the position shown in broken line. When released, the control handle 150 may be slid along the horizontal frame member 24 in the fore and aft direction, as indicated by the arrows 154 and 156.

The horizontal frame member 24 may have wheel turn indicia 158A, 158B, 158C, 158D, 158E disposed to indicate the degree to which movement of the steering control handle 150 steers the rear wheel 44.

The present invention is susceptible to modifications and variations which may be introduced thereto without departing from the inventive concepts. For example, although the invention has been described with respect to bicycles, it may apply equally to other vehicles. The invention is not to be limited by the examples presented above, but is to encompass any structures falling within the scope of the appended claims.

I claim:

1. A rear wheel steering system for a wheeled vehicle, comprising:
   a housing supporting a rotatable rear drive element, wherein the housing contains a drive shaft having a universal drive adapted to rotate the rear wheel responsive to movement of an endless flexible drive element, the drive shaft comprising a primary driven shaft driven by an endless flexible drive element, an intermediate driven shaft, a final universal joint disposed to couple the primary driven shaft with the intermediate driven shaft, a final driven shaft, and a second universal joint disposed to couple the intermediate shaft with the final driven shaft;
   a wheel spindle which is supported on the housing in a manner enabling the wheel spindle to pivot about a generally vertical axis, a rear wheel which is rotatably mounted on the wheel spindle in a manner enabling the wheel to rotate about a horizontal axis to enable propulsion of the wheeled vehicle, and at least one steering arm fixed to the wheel spindle, wherein the rear wheel is drivably coupled to the final driven shaft, and wherein the wheel spindle is also supported on the housing to pivot about a generally vertical axis to enable steering of the rear wheel;
   a flexible cable based steering system comprising a flexible cable adapted to provide steering rotation inputs to the rear wheel, wherein the flexible cable is anchored at the steering arm; and
   a steering control handle mounted on the wheeled vehicle and adapted to transmit operating forces to the flexible cable responsive to being moved along the wheeled vehicle by a person's hand, such that the flexible cable imparts steering inputs to the rear wheel responsive to the operating forces.

2. The rear wheel steering system according to claim 1, further comprising a brake disc mounted proximate the rear wheel, at least one brake caliper disposed to impose braking forces to the brake disc, and wherein the brake caliper is mounted on the steering arm.

3. The rear wheel steering according to claim 1, further comprising a grooved track bearing an arcuate groove fixed to the housing, and a guide arm fixed to the spindle, wherein the guide arm has a pin bearing an enlarged head which interfits with the arcuate groove of the grooved track, whereby the spindle is guided to move through an arcuate path by the guide arm and the grooved track when the spindle rotates about the generally vertical axis.

* * * * *